United States Patent

[11] 3,564,276

| [72] | Inventor | Jack Van Eijnsbergen<br>124 E. Hickory Grove Road, Bloomfield Hills, Mich. 48013 |
|---|---|---|
| [21] | Appl. No. | 768,606 |
| [22] | Filed | Sept. 25, 1968 |
| [45] | Patented | Feb. 16, 1971 |
| [32] | Priority | Dec. 23, 1963 |
| [33] | | Austria |
| [31] | | 243386/63 |
| | | Continuation-in-part of application Ser. No. 420,412, Dec. 22, 1964, now abandoned. |

[54] APPARATUS FOR GENERATING PULSATING CURRENTS OF HIGH AMPERAGE
4 Claims, 9 Drawing Figs.

[52] U.S. Cl.................................................. 307/106;
 321/45
[51] Int. Cl.................................................. H02m 7/52
[50] Field of Search........................................ 307/106,
 107; 321/45 (CX); 323/45

[56] References Cited
UNITED STATES PATENTS

| 3,207,974 | 9/1965 | McMurray .................. | 321/45 |
| 3,303,407 | 2/1967 | Depenbrock et al. ........ | 321/45 |
| 3,417,315 | 12/1968 | Corey.......................... | 321/45C |

*Primary Examiner*—Robert K. Schaefer
*Assistant Examiner*—T. B. Joike
*Attorney*—Edwin E. Greigg ABSTRACT: An apparatus for generating pulsating currents of high amperage with adjustable pulse spacing and pulse duration which utilizes a load in a circuit having an input and neutral leads and two controlled rectifiers. The voltages fed to the input lead of the load are alternatively positive or negative with respect to the potential of the neutral lead of the load, the positive voltage being controlled by a first controlled rectifier and the negative voltage being controlled by a second controlled rectifier, and selectively applying a negative reverse voltage to the first rectifier and a positive reverse voltage to the second rectifier.

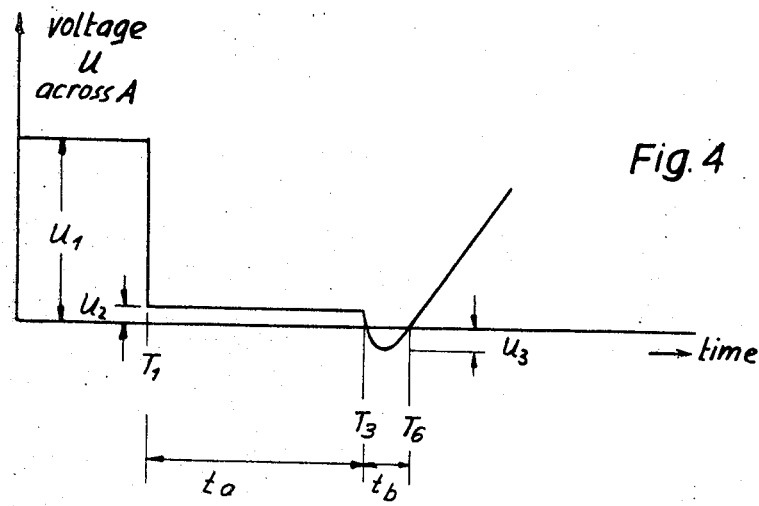
Fig. 4
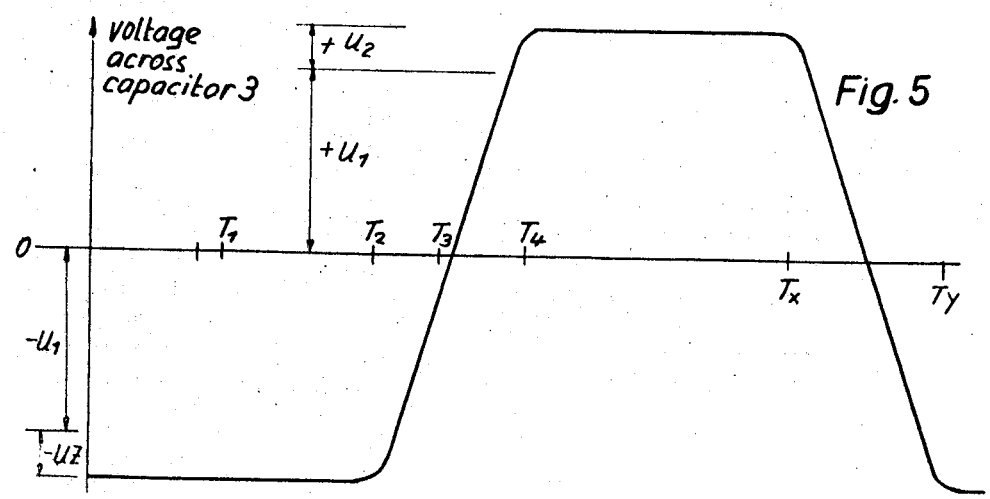
Fig. 5
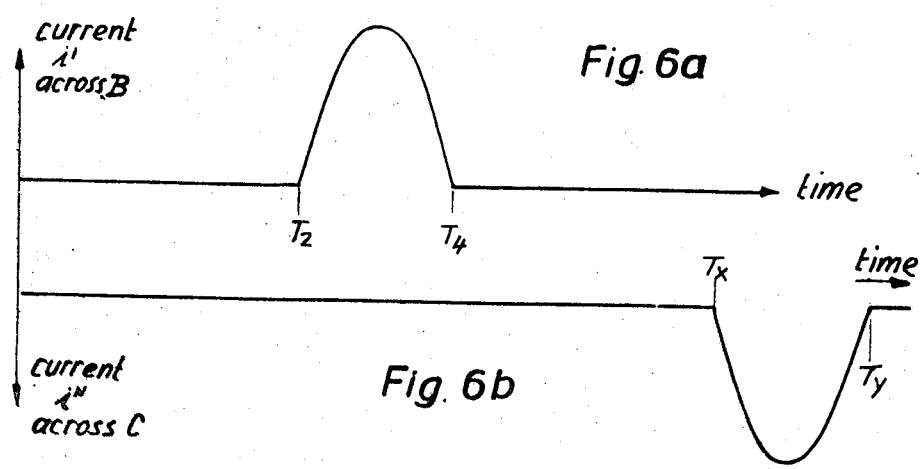
Fig. 6a
Fig. 6b

APPARATUS FOR GENERATING PULSATING CURRENTS OF HIGH AMPERAGE

This application is a continuation-in-part application of Ser. No. 420,412, filed Dec. 22, 1964 and now abandoned.

The invention relates to apparatus for generating pulsating currents of high amperage, with adjustable pulse spacing and pulse duration.

Pulse sequences having current intensities of several thousand amps. are principally used in the electrochemical industry. It is desirable, for example with anodic coating, with electrolytic production of certain metals, particularly aluminum, magnesium, electrolytic copper, or with the production of heavy water, etc. to have available controlled pulse sequences, i.e. series of pulses of predetermined duration and following each other in predetermined intervals.

Though many attempts for solving this problem have been made, only limited results were obtained which are unsatisfactory. Difficulties are experienced mainly with the insufficient switching means available until now which, though they enable to switch-in high intensity currents from 100 to 700 amps., cannot satisfactorily switch off such currents, and the difficulties increase when short pulse durations have to be chosen.

It has been proposed to solve this problem by mechanical means, for example by high intensity current switches. In such switches a powerful arc discharge is obtained between the electrodes when breaking the connection and the usefulness of such devices is limited for generating high impulse currents. They accordingly can be used only for low voltages and current intensities from 5 to 8000 amps., while for higher currents only a very reduced number of switchings are possible per unit of time.

Known controllable switching means are for example the mercury vapor tubes, the ignitron and thyratron tubes, and switching elements of the semiconductor type, for example silicon rectifiers, for generating pulsating currents by means of ignitron or thyratron tubes different switching arrangements have become known. By means of a simple example of switching, the limits of such arrangements shall be explained. In the most simple case pulse currents can be obtained in a load which usually is connected to the secondary of a transformer, by feeding alternating current voltage to the primary of the transformer across two valves connected in parallel with opposite polarity to the primary. When for example the valve associated with the positive current direction is fired upon attaining the desired value of amplitude of the positive half-wave of the alternating current voltage, the current flowing through the valve increases and afterwards decreases in almost sinusoidal manner. The valve, in the present case a mercury vapor tube, or an ignitron or thyratron, cannot prematurely switch off the current, but it will extinguish when the negative half-wave of the alternating current voltage has attained a correspondingly high amplitude. When at this moment the reverse potential is relatively high, the danger exists that the tube fires back and will be damaged. This backfiring is due to the residual ionization present in the tube. For the recombination of the ions a certain time is required. During this recovery time the tube may not be loaded too high. For this reason the pulse sequences generated by alternating voltages and valve tubes are limited as to the pulse spacing and to the pulse duration which may be obtained. A certain possibility of control exists, but it is by far not sufficient. In the same manner as with these switching tubes, a recovering time is required with controlled semiconductor rectifiers, for example the known silicon controlled rectifiers. Therefore, the application of such rectifiers is limited, and when the time between voltage changes is short, conditions arise which may lead to damaging or destroying the rectifiers. For this reason such semiconductor rectifiers can be used only for switching off relatively small currents. For example, the newest silicon-gate controlled switchs can be used only for switching currents up to 10 amps.

For generating short duration voltage pulses it is conventional to use capacitor discharges. In a generally known basic switching arrangement a capacitor is charged from a direct current voltage source via a charging resistor. The load, for example the primary winding of a transformer, and the switching member, i.e. the valve, such as a tube of the type already mentioned, or a semiconductor switching element, are connected in parallel with the condenser. The phenomena occuring upon switching correspond to those already mentioned, only they happen in a much shorter time. Therefore the danger of backfiring is greater, since the tube or the semiconductor element has less time at its disposal for deionization or recombination. The charging of a capacitor by the intermediary of a resistor has the additional inconvenience that the negative overshoot oscillation occurring in the switching circuit upon discharge is practically completely used in the charging resistor and accordingly is not available to the load.

Different switching arrangements have been proposed for generating pulsating currents. As long as comparatively small current intensities are involved, this problem has been solved in sufficient and satisfactory manner. However, when high and extremely high current intensities have to be switched all known circuit arrangements show the basic drawbacks already explained and it has hitherto not been possible to generate high pulsating currents having any desired pulse spacing and pulse duration.

It is accordingly an object of the invention to provide apparatus capable of attaining very high switching velocities for high current intensities, and in which the duration of a pulse and the number of switchings per unit of time according to requirements can be adjusted or controlled within wide limits.

It is a further object of the invention to provide apparatus adapted to realize with greatest possible approximation the theoretically determined optimum conditions for a manufacturing process, as far as pulse level, pulse duration and pulse spacing is concerned and, if desired, to provide automatization of the different operations. It shall therefore be possible to vary the pulse width and the pulse spacing according to a predetermined schedule during the manufacturing process.

It is a further object of the invention to operate the pulsating current generator on direct current or alternating current; however, in the later case limitations will be obtained depending on the frequency of the alternating current, primarily as far as the pulse spacing is concerned. In many cases, working with alternating current will be preferred, particularly when relatively short pulse spacings are advantageous for any manufacturing process.

It is also an object of the invention to provide a pulsating current generating apparatus in which conventional controllable switching valves, such as mercury vapor tubes, ignitrons or thyratrons, or other controllable semiconductor rectifiers can be used.

The apparatus for generating pulsating currents of high amperage according to the invention comprises an electric circuit, a load in said circuit having input and neutral leads, two controlled rectifiers included in said circuit and feeding voltages to the input lead of the load, said voltages being alternately positive or negative with respect to the potential of said neutral lead of the load, the positive voltage being controlled by the first controlled rectifier and the negative voltage being controlled by the second controlled rectifier, and means for selectively applying negative reverse voltage to said first rectifier and positive reverse voltage to the second rectifier, said reverse voltage having a higher value with respect to the potential of the neutral lead than that of the voltage controlled by said rectifiers, and extinguishing said rectifiers.

The reverse voltage will have at the source a value at least double that of the voltage controlled by said controlled rectifiers, which value will drop rapidly until conduction of said rectifiers ceases. After this, there will be still enough reverse voltage applied to said rectifiers for a time long enough to keep the rectifiers blocked. The source of the reverse voltage is a capacitor one electrode of which has a voltage value almost that of the voltage controlled by said controlled rectifiers and the other electrode of which has a voltage value at least double that voltage, both values with respect to the potential of the neutral lead.

The invention is illustrated by way of example in the accompanying drawings.

FIG. 4 illustrates the variation of voltage at the valve A as function of time;

FIG. 5 shows the capacitor voltage as function of time;

FIGS. 6a and 6b show the variation of the current flowing through valve B and valve C as function of time;

Figure 1:
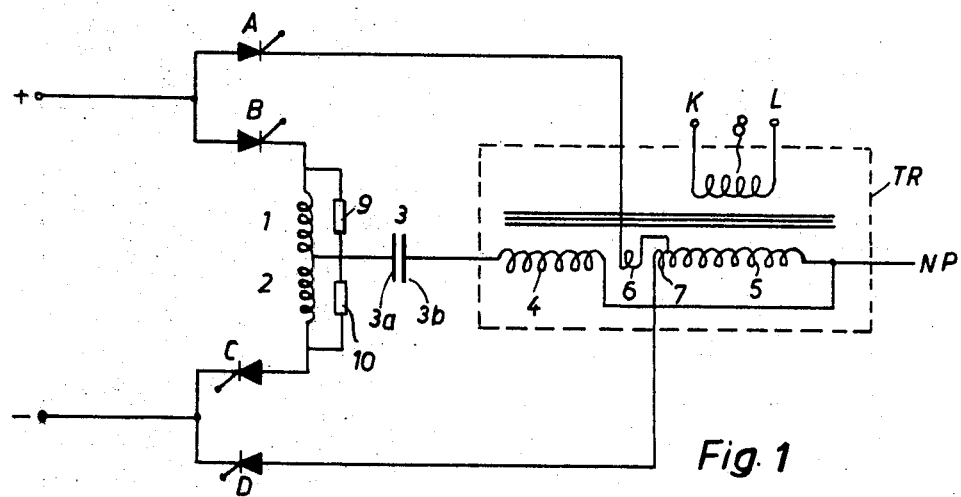
FIG. 1 is an embodiment of a generating apparatus according to the invention in the form of a circuit arrangement in which the impulse sequence is generated by feeding direct current to the apparatus.

Referring to FIG. 1 the apparatus according to the invention may be connected for example to a direct current source by means of three conductors (+, NP, −). As represented the secondary load device is connected to the terminals K and L of the secondary winding 8 of a transformer TR, the primary winding 5 of which is connected at one side to the zero conductor or neutral lead NP and at the other or input side to the positive conductor and the negative conductor, respectively, of the direct current net by a valve A and by a valve D, respectively, and by an additional transformer winding 6 and 7, respectively. A further transformer winding 4 is provided in parallel with the primary winding 5; one side of the winding 4 is connected to the neutral lead NP and the other side to one electrode 3b of a capacitor 3. The other electrode 3a of the capacitor is connected to the plus and minus terminals of the direct current net by the intermediary of inductance coils 1 and 2, respectively, and further valves B and C, respectively. If required, resistors 9 and 10 can be connected in parallel with the inductance coils 1 and 2, and likewise relatively high resistances can be connected in parallel with the valves and the transformer, either alone or in combination with small capacitors, as it is usual in rectifying installations. Since such additional resistances and capacitors are not necessary for the understanding of the invention, they have not been shown except the resistors 9 and 10.

The valves A, B, C and D in principle are constituted by controllable devices, such as necessary vapor tubes, gas-filled discharge tubes (e.g. ignitrons, thyratrons) or other controllable rectifiers of the semiconductor type such as silicon controlled rectifiers. The polarity of the different valves is seen from the drawing and does not require any particular explanation.

For facilitating the description of the mode of operation of the arrangement, it is assumed that the direct current net maintains a positive and a negative potential of +500 v and −500 v with respect to the neutral lead and that the electrode 3a of the capacitor 3 is charged to a voltage of −550 v with respect to NP. Such a charge of the capacitor 3 can easily be effected by means of a usual small charging equipment.

Figure 2:
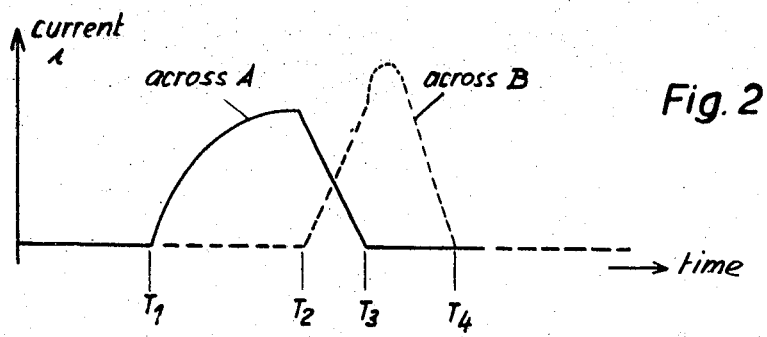
FIG. 2 shows a diagram illustrating the current intensity through valve A and valve B as function of the time.
Figure 3:
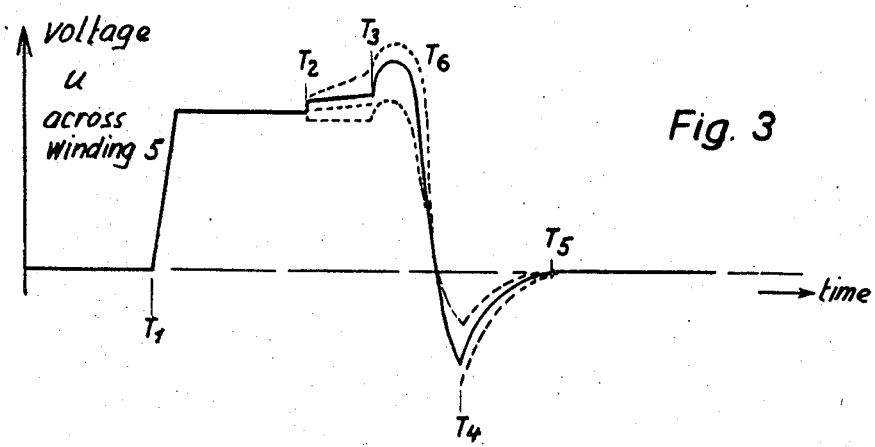
FIG. 3 shows the variation of voltage at the primary winding of the transformer as function of the time.

The diagrams of FIGS. 2, 3 and 5 serve for explaining the mode of operation. In FIG. 2 the flow of current through valve A (full lines) and through valve B (dotted lines) is represented as function of time; FIG. 3 shows the voltage occurring at the primary winding 5 as function of time.

At the time $T_1$ the valve A is fired. The current flowing through the valve slowly increases in response to the load and attains its rated value at the time $T_2$. During this time a voltage variation appears at the primary winding 5 as follows (FIG. 3). Prior to excitation no voltage is applied to the primary winding, since its one side is connected to the neutral lead and all valves are blocked. When the valve A is put in conduction, at the time $T_1$, the voltage rapidly increases from 0 to the rated voltage of the direct current net and then remains substantially constant until $T_2$. The current flows through the winding 5 and at the same time induces a voltage in the winding 4, resulting in an increase of potential of the electrode 3b of the capacitor 3 to about +500 v owing to the selected ratio of windings of the windings 5 and 4. By reason of the prior charge of the capacitor, the potential of the electrode 3a changes to −50 v. At the time $T_2$ the valve B will be excited. The electrode 3a of the capacitor changes its potential from −50 v to +500 v and accordingly the potential of the electrode 3b changes from +500 v to +1050 v. The capacitor 3 starts to discharge over the primary winding 4 and owing to its higher voltage it supplies current to the transformer, since a higher voltage than the net voltage is induced in the winding 5. As soon as capacitor 3 starts to discharge, the impedance of the induction coil 1 and of winding 4 will limit the current increase through winding 4 and the induced voltage in winding 5. The impedance of winding 6 limits the current decrease through valve A. Simultaneously and according to the increase of current in the valve B the current through valve A decreases (FIG. 2) until it stops entirely at the time $T_3$. At this time $T_3$, as can be seen in FIG. 5, capacitor electrode 3a is still negative with respect to 3b and as 3a has now a voltage of almost +500 v with respect to NP (this is the net voltage reduced by the voltage drop through the rectifier B and the induction coil 1), 3b has a voltage higher than +500 v. The current increases then and induces a higher voltage as the net voltage in winding 5 until $T_6$. After this, voltage and current decrease until $T_4$. At this time $T_4$ the electrode 3b of the capacitor is below zero potential owing to the magnetic energy stored in the transformer (FIG. 3), the electrode 3a is at the potential +500 v and the valve B extinguishes. During discharging of the capacitor 3 magnetic energy has stored up in the inductance coil 1, and this energy becomes effective after extinguishing as an increase of capacitor voltage, for example to +550 v.

In the voltage diagram of FIG. 3 these phenomenon occur with a sudden small modification of voltage at the primary winding 5 of the transformer TR when firing the valve B at the time $T_2$; after $T_3$, i.e. when the passage of current through valve A has ceased, a further small increase of voltage occurs as the capacitor 3 has still a higher voltage, and when the voltage decreases and is inversed, a decrease of voltage occurs at the capacitor electrode 3b which until the time $T_4$ at which also the current passage through valve B has ceased, results in negative voltage values at the primary winding 5. Beginning with the time $T_4$, the voltage again will increase until zero potential which is reached at the time $T_5$. At the same time the magnetic energy stored in the transformer TR is discharged by the secondary winding to the connected secondary load.

The capacitor 3 now is inversely charged relatively to its starting value, the electrode 3a is charged at +550 v and the electrode 3b is again at zero potential.

According to a predetermined time schedule the valve D can be fired and subsequently the valve C, and then all phenomena described are repeated, but with inversed polarity.

The valves A and D, as well as the valves B and C can be fired according to a predetermined time schedule by means of firing devices of known type. The firing schedule for the valves A and D determines the pulse spacing. The valves A and D are switched off by applying a considerable reverse voltage, which is effected by firing the valves B and C. The time schedule of the valves B and C accordingly determines the width of the pulses. The switching out of the valves B and C is effected automatically by the decreasing voltage at the capacitor 3. The occurrence of voltage variation at the valves A and D as a function of time is important for the comprehension of the operation.

FIG. 4 shows the variation of voltage across the valve A during the switching operation. Before firing at the time $T_1$ the voltage across valve A is the full net voltage $U_1$; after firing at $T_1$ the voltage decreases to a small residual voltage $U_2$ which is determined by the voltage drop of the valve; its value for mercury vapor tubes is about 16 to 20 volts, for silicon controlled rectifiers about 1 volt. This voltage remains constant as long as the valve A is excited, i.e. the tube or the semiconductor is in conductive condition, accordingly until the voltage is switched off at $T_3$. As explained previously, beginning with this time $T_3$ the higher voltage applied against the valve A becomes effective, i.e. the voltage at the valve A becomes negative with respect to the polarity of the valve, until the capacitor voltage has passed the zero value at $T_6$. From now on the voltage on the valve A again becomes positive until it has reached its starting value $U_1$. The negative voltage applied to the valve A during the time $(T_6-T_3) = {}_b$ is important for the operation of the arrangement. The maximum value of this negative voltage shall be designated by $U_3$. At the time $T_3$ the valve has just extinguished; at the time $T_6$ the voltage at the valve A becomes again positive. The time period $t_b$ must have at least such a value that the discharge tube has again become deionized by recombination, or the semiconductor has sufficiently recovered i.e. this time period must be at least equal to the proper recovering time of the valve. The value of the negative voltage may not be so high that a backfire could occur. The gradual increase of the negative voltage is favorable for the circuit arrangement; this voltage attains its maximum when already approximately one-half of the recovering time has lapsed i.e. when the valve is no longer sensitive to backfire effects.

The determination of the time $t_b$ and of the value of the negative blocking voltage is effected by an appropriate dimensioning of the inductance coils 1 and 2 and of the capacitor 3, which has to be so designed that the valves extinguish during a time period of sufficient length to prevent secondary effects. This period of time is for example 20 to 100 microseconds for ignitrons; accordingly this time is sufficiently short to be without any importance for a desired pulse spacing.

For purposes of a complete description, FIG. 5 shows the voltage curve at the condenser 3 and FIGS. 6a and 6b the current flow across valves B and C, respectively, as function of time. As already stated, before firing of the valve A, the capacitor has applied thereto a voltage of $-550$ v. This voltage is maintained until the capacitor starts to discharge after firing of the valve B. By the intermediary of the excited valve B the capacitor subsequently becomes positive up to net voltage $+U_1$ and further by the magnetic energy stored in the inductance coil 1 and the transformer winding 4 it will be charged additionally with an amount $U_z$, thus in the described example to $+550$ v. At this time $T_4$ also the valve B is switched off. The positive voltage is maintained until the time $T_x$ when the valve C is fired. From now on the capacitor 3 begins to discharge again. By the intermediary of the fired valve C the capacitor is again charged to the negative net voltage $-U_1$ and further by the released magnetic energy stored in inductance coil 2 and in the transformer with the additional negative voltage $-U_z$. For each switching cycle this mode of operation is repeated.

The period of time from $T_2$ to $T_4$, in which the capacitor 3 discharges from its negative maximum voltage and charges to its positive maximum voltage, a current $i'$ flows through valve B (FIG. 6a) which has its highest value at the capacitor voltage zero. In the same manner a current $i''$ flows through valve C in the period of time $T_x$ to $T_y$, during which the voltage at the capacitor charges from its positive to its negative maximum value.

The increased voltages $\pm U_z$ at the capacitor furnish, as already stated, negative blocking voltages for the valves A and D. These blocking voltages are convenient since they represent an additional safety factor for the arrangement. Obviously there can be cases where such a safety factor is not indispensible. In most cases, however, the voltage variation at the capacitor 3 is more than the double of the net voltage, calculated with respect to zero. The winding 4, for this reason will be given a higher number of coils than the winding 5. How this will influence the voltage diagram of the primary winding 5 is shown in FIG. 3 for two modifications by dotted lines. In one case the number of coils is greater and in the other case smaller than the number of coils assumed in the described example.

In most applications of the invention, the load on the valves A and D will be greater than on the valves B and C. The valves B and C can then be made smaller than the valves A and D. Since, however, the capacitor discharge is consumed by the transformer load, the valves B and C producing the capacitor discharge not only constitute control members, but precisely the main valves which are important for the switching of the capacitor. This means that under certain conditions, in such cases in which only comparatively short duration pulses are required, the valves A and D also can be eliminated.

Instead of using direct current, the arrangement according to the invention also can operate with alternating current voltage. The inputs of all four valves in this case are connected to one pole of the alternating current net and the output of the primary winding 5 to the other pole which is sometimes grounded. It has already been mentioned that certain limitations in the pulse spacing and the duration of pulses are obtained when the arrangement is operated by alternating current, which will be understood without further explanation. It also is clear that the transformer TR can operate as auto transformer having a single long primary winding and a corresponding tap for the winding sections 4, 5, 6 and 7. In special cases the windings 4, 6 and 7 can be eliminated and all connections can be made to the winding 5.

Further it is not necessary that the load is a transformer in an arrangement according to the invention. The connection of the load, for example an electromagnet, a motor, an electrolytic bath, a gas discharge tube, etc. can be made directly without the intermediary of a transformer. However, this will be the case only when impulse currents which are not extremely high impulse currents are to be produced. Precisely the use of a transformer makes it possible to obtain on the secondary very high pulsating currents, without important losses, since in this case the switching occurs on the primary and is carried out at substantially lower current intensities.

When a pulsating direct current is required, conventional simple rectifiers can be connected between the secondary of the transformer and the secondary load.

A further and substantial advantage of the circuit arrangement according to the invention is its high efficiency. This latter is due to the low voltage drops in the valve which may be used, and primarily to the fact that the major portion of the magnetic energy of the transformer really is available at the secondary to the current consumer, while only a small residual portion of this energy is used for the additional charging of the capacitor.

Figure 7A:
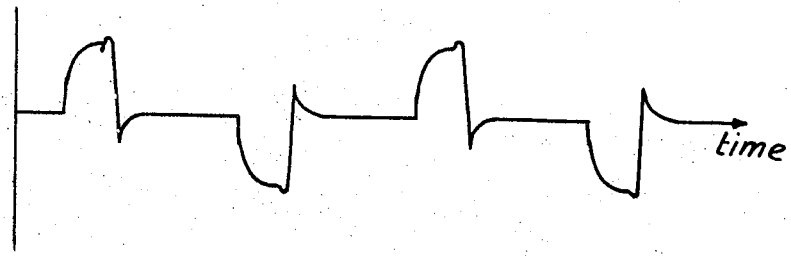
FIGS. 7a and 7b represent two different impulse sequences which may be obtained by this invention.
Figure 7B:
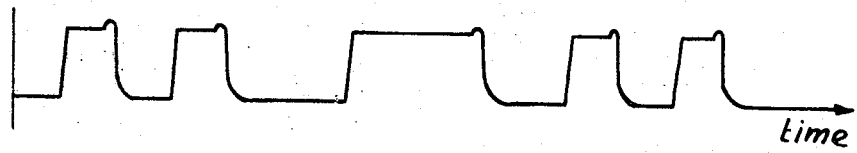

FIG. 7a represents an example of a pulse sequence which can be obtained by the apparatus according to the invention. The duration of the pulses and the spacing of the pulses are adjustable or controllable. This is explicitly illustrated by the pulse sequence shown in FIG. 7b. This sequence only shows positive pulses having different durations and spacings, and can be obtained, as already stated, by interposition of a rectifier device. It will be understood that the described apparatus for the production of pulsating currents of high amperage, in which the pulse spacings of a pulse sequence are obtained by alternately firing of two controllable valves, and the width of the pulses by controlled extinguishing of the valves, accomplishes the objects of the invention.

I claim:

1. Apparatus for generating pulsating currents of high amperage with adjustable pulse spacing and pulse duration, comprising an electric circuit, a load in said circuit having input and neutral leads, two controlled rectifiers included in said circuit and feeding voltages to the input leads of the load, said voltages being alternately positive or negative with respect to the potential of said neutral lead of the load, the positive voltage being controlled by the first controlled rectifier and the negative voltage being controlled by the second controlled rectifier, and means for selectively applying negative reverse voltage to said first rectifier and positive reverse voltage to the second rectifier, said reverse voltage having a higher value with respect to the potential of the neutral lead than that of the voltage controlled by said rectifiers, and extinguishing said rectifiers, said load having connected thereto a capacitor for supplying said reverse voltage, means being provided for controllable discharging or reversal of the charge of the capacitor, said first controlled rectifier connecting one of said load input leads to the positive pole of the power supply, said second controlled rectifier connecting another of said load input leads to the negative pole of the power supply, and an inductance winding, one of the electrodes of said capacitor being connected to said neutral lead through said inductance winding, the other electrode of the capacitor being connected to each of said poles of the power supply by a pair of inductance coils, each being connected in series with a further controlled rectifier, said other electrode of the capacitor being connected to the junction of said pair of coils, the free ends of each coil being connected to a further controlled rectifier.

2. Apparatus for generating pulsating currents of high amperage with adjustable pulse spacing and pulse duration, comprising an electric circuit, a load in said circuit having input and neutral leads, two controlled rectifiers included in said circuit and feeding voltages to the input leads of the load, said voltages being alternately positive or negative with respect to the potential of said neutral lead of the load, the positive voltage being controlled by the first controlled rectifier and the negative voltage being controlled by the second controlled rectifier, and means for selectively applying negative reverse voltage to said first rectifier and positive reverse voltage to the second rectifier, said reverse voltage having a higher value with respect to the potential of the neutral lead than that of the voltage controlled by said rectifiers, and extinguishing said rectifiers, said load having connected thereto a capacitor for supplying said reverse voltage, means being provided for controllable discharging or reversal of the charge of the capacitor, said first controlled rectifier connecting one of said load input leads to the positive pole of the power supply, said second controlled rectifier connecting another of said load input leads to the negative pole of the power supply, and one of the electrodes of said capacitor being connected to said neutral lead, the other electrode of the capacitor being connected to each of said poles of the power supply by an inductance coil in series with further controlled rectifiers, a secondary load connected to the secondary of a transformer, the primary of which is connected, by one of its ends and a further winding, to said first mentioned rectifier connected to one pole of the power supply, and by said same end and another winding to said second controlled rectifier connected to the other pole of the power supply, said transformer being provided with a further primary winding having one end connected to one of the electrodes of said capacitor, and having the other end connected to the other end of said first mentioned primary, which other end is connected to the neutral lead of said power supply.

3. Apparatus according to claim 2, in which said further primary winding of the transformer connected to one electrode of said capacitor has a greater number of coils than said first mentioned primary connected to said power supply net across said first and second controlled rectifiers.

4. Apparatus according to claim 2, in which said transformer is constituted by an auto transformer.